United States Patent
Stoupis et al.

(10) Patent No.: US 6,741,943 B2
(45) Date of Patent: May 25, 2004

(54) CROSSOVER FAULT CLASSIFICATION FOR POWER LINES WITH PARALLEL CIRCUITS

(75) Inventors: James D. Stoupis, Raleigh, NC (US); David Lubkeman, Raleigh, NC (US); Reto Buettner, Erlenbach (CH); David G. Hart, Raleigh, NC (US)

(73) Assignee: ABB Power Automation Ltd., Baden (CH)

( * ) Notice: Subject to any disclaimer, the term of this patent is extended or adjusted under 35 U.S.C. 154(b) by 49 days.

(21) Appl. No.: 09/951,495

(22) Filed: Sep. 13, 2001

(65) Prior Publication Data

US 2003/0081364 A1 May 1, 2003

(51) Int. Cl.$^7$ ................................ G01R 31/00
(52) U.S. Cl. .......................... 702/58; 361/80
(58) Field of Search ............... 702/57–59, 60, 702/62, 64, 65, 72, 115, 117, 122, 124, 126, 182–185, 188, 189; 361/63, 67, 76, 80, 85; 700/293, 294; 324/522; 340/658

(56) References Cited

U.S. PATENT DOCUMENTS

| | | | |
|---|---|---|---|
| 4,063,166 A | 12/1977 | Glavitsch et al. ............. 324/52 |
| 4,148,087 A * | 4/1979 | Phadke ........................ 361/80 |
| 4,366,474 A * | 12/1982 | Loewenstein ............... 340/658 |
| 4,398,232 A * | 8/1983 | Elmore ........................ 361/47 |
| 4,455,612 A * | 6/1984 | Girgis et al. ................. 700/294 |
| 4,600,961 A * | 7/1986 | Bishop ........................ 361/76 |
| 4,996,624 A * | 2/1991 | Schweitzer, III ............. 361/63 |
| 5,198,746 A * | 3/1993 | Gyugyi et al. ............... 323/207 |
| 5,274,264 A | 12/1993 | Yung .......................... 257/529 |
| 5,311,541 A | 5/1994 | Sanderford, Jr. ............. 375/131 |
| 5,311,542 A | 5/1994 | Eder ........................... 375/130 |
| 5,343,139 A * | 8/1994 | Gyugyi et al. ............... 323/207 |
| 5,352,983 A * | 10/1994 | Eriksson et al. ............. 324/522 |
| 5,374,861 A * | 12/1994 | Kubista ....................... 326/30 |
| 5,428,549 A * | 6/1995 | Chen ........................... 702/59 |
| 5,446,387 A * | 8/1995 | Eriksson et al. ............. 324/522 |
| 5,493,228 A * | 2/1996 | Eriksson et al. ............. 324/522 |
| 5,515,227 A * | 5/1996 | Roberts et al. .............. 361/67 |
| 5,602,709 A * | 2/1997 | Al-Dabbagh ................ 361/85 |
| 5,661,664 A * | 8/1997 | Novosel et al. ............. 700/293 |
| 5,694,281 A * | 12/1997 | Roberts et al. ............. 361/80 |
| 5,783,946 A * | 7/1998 | Yang ........................... 324/522 |
| 5,883,796 A * | 3/1999 | Cheng et al. ............... 363/40 |
| 5,944,842 A | 8/1999 | Propp et al. ............... 714/701 |
| 6,097,280 A * | 8/2000 | Takeda et al. ............. 340/310.02 |
| 6,128,276 A | 10/2000 | Agee ........................... 370/208 |
| 6,212,048 B1 * | 4/2001 | Chaudhry ................... 361/42 |
| 6,331,765 B1 * | 12/2001 | Yamamoto et al. ......... 323/210 |
| 6,466,031 B1 * | 10/2002 | Hu et al. .................... 324/522 |
| 6,529,010 B1 * | 3/2003 | Saha et al. .................. 324/525 |

OTHER PUBLICATIONS

Phadke, A.G., Jihuang, Lu, "A New Computer Based Integrated distance Relay For Parallel Transmission Lines," *IEEE Trans. on Power Appar. and Systems*, Feb. 1985, vol. PAS–104, No. 2, pp. 445–452.

Badawy, E. H., et al., "A Method Of Analyzing Unsymmetrical Faults On Six–Phase Power Systems," *IEEE Trans. on Power Delivery*, Jul. 1991, vol. 6. No. 3, pp. 1139–1145.

Anderson, P., "Changes In Symmetry," *Analysis of Faulted Power Systems*, Chapter 8, IEEE Press, ISBN 0–7803–1145–0, pp. 273–283.

* cited by examiner

*Primary Examiner*—Marc S. Hoff
*Assistant Examiner*—Mohamed Charioui
(74) *Attorney, Agent, or Firm*—Woodcock Washburn LLP

(57) ABSTRACT

The invention describes a method, system, device, and computer-readable medium having computer-executable instructions for classifying faults on an electrical power line. In particular, the invention permits the classification of crossover faults, using a local measurement technique. The inventive method includes providing a first electrical power transmission line and a second electrical power transmission line, and monitoring the first electrical power transmission line to identify a crossover fault occurring between the first and the second electrical power transmission lines.

53 Claims, 10 Drawing Sheets

CROSSOVER FAULT CLASSIFICATION FOR POWER LINES WITH PARALLEL CIRCUITS

CROSS-REFERENCE TO RELATED APPLICATIONS

The subject matter disclosed herein is related to the subject matter disclosed in the following applications: U.S. patent application Ser. No. 09/951,925 filed Sep. 13, 2001, U.S. patent application Ser. No. 09/951,689 filed Sep. 13, 2001, U.S. patent application Ser. No. 09/951,267 filed Sep. 13, 2001, and U.S. patent application Ser. No. 09/951,922 filed Sep. 13, 2001.

TECHNICAL FIELD OF THE INVENTION

The invention generally relates to the field of fault classification. More particularly, the invention relates to classifying crossover faults on power lines.

BACKGROUND OF THE INVENTION

The operation of every electrical power transmission system requires the proper handling of electrical faults that occasionally occur. Such faults stem from a variety of events including lightning strikes, stray animals, and falling branches, for example. In order to return the power system to proper operation, certain characteristics of the fault must be determined. For example, the location and severity of the fault is essential to clearing the fault so that the power system can resume normal operation.

There are a number of different types of faults that may occur, such as phase-to-ground fault, phase-to-phase fault, and crossover faults. Phase-to-ground and phase-to-phase faults describe fault conditions that occur between conductors of the same circuit. Crossover faults, on the other hand, describe a fault condition that occurs between conductors of different circuits. The different circuits may or may not be in parallel (i.e., carrying power to and from the same locations). Classifying the type of fault also may be important in taking proper action to restore the power system to normal operation. For example, classifying a fault may enhance protection schemes by preventing the mistaken protection of just one of the two crossover-faulted circuits. Also, incorporating the type of fault into fault location algorithms can enhance the fault-locating techniques.

Recently, the classification of faults, and crossover faults in particular, has become increasingly more important as land restrictions and aesthetic concerns have limited the use of high voltage transmission lines, thus requiring that existing electrical towers be used to carry multiple circuits, in lieu of building new towers. To date, the classification of faults has been accomplished using multi-terminal techniques. For example, for crossover faults both three-phase circuits must be monitored in order to classify the fault as a crossover fault. However, this is especially difficult with crossover faults because, as mentioned, the different circuits involved in the crossover fault may not start and end at the same location (i e., the circuits are not in parallel). Therefore, complicated communication networks must be used to bring the data to a central location. Moreover, as may be expected, coordinating data between two different circuits (even where the circuits are in parallel) is inherently more complicated than simply monitoring one circuit.

Therefore, a need exists to classify crossover faults by monitoring one of the affected conductors in the electric power transmission system.

SUMMARY OF THE INVENTION

The invention describes a method, device, system, and computer-readable medium having computer-executable instructions for classifying faults on an electrical power line. In particular, the invention permits the classification of crossover faults (commonly referred to as faults that involve multiple circuits), using a local measurement technique. By distinguishing between crossover faults and other faults, the invention permits a more efficient and effective return of the power system to normal operation.

The inventive method includes providing a first electrical power transmission line and a second electrical power transmission line, and monitoring the first electrical power transmission line to identify a crossover fault occurring between the first and the second electrical power transmission lines. For example, one method for classifying faults on an electrical power line analyzes the phase relationships between the positive and negative-sequence voltage drops on a circuit. In particular, the invention may measure a fault and prefault electrical characteristic (e.g., current and/or voltage) on the first electrical power line. The method may determine a positive-sequence component for the fault and prefault electrical characteristics, and a negative-sequence component for the fault and prefault electrical characteristics. The method may then calculate a positive-sequence difference between the positive-sequence components of the fault and prefault electrical characteristics, and calculate a negative-sequence difference between the negative-sequence components of the fault and prefault electrical characteristics. The method may then calculate a first difference between a phase angle of the positive-sequence difference and a phase angle of the negative-sequence difference. The method further may include identifying that the fault is a crossover fault, a single-phase-to-ground fault, and/or a fault is not a phase-to-phase fault. The inventive method may act to correct the fault as a function of the classifying, and/or identify a location of the fault as a function of the classifying. The above method may be conducted by computer-executable instructions located on a computer-readable medium.

The inventive device includes a first input for receiving electrical power from a first part of an electrical transmission line, and a second input for receiving electrical power from a second part of an electrical transmission line. The device further includes a processor component for classifying faults on an electrical power line, where the processor performs the method described above.

The foregoing and other aspects of the invention will become apparent from the following detailed description of the invention when considered in conjunction with the accompanying drawings.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Overview of Electric Power Transmission System

Figure 1:
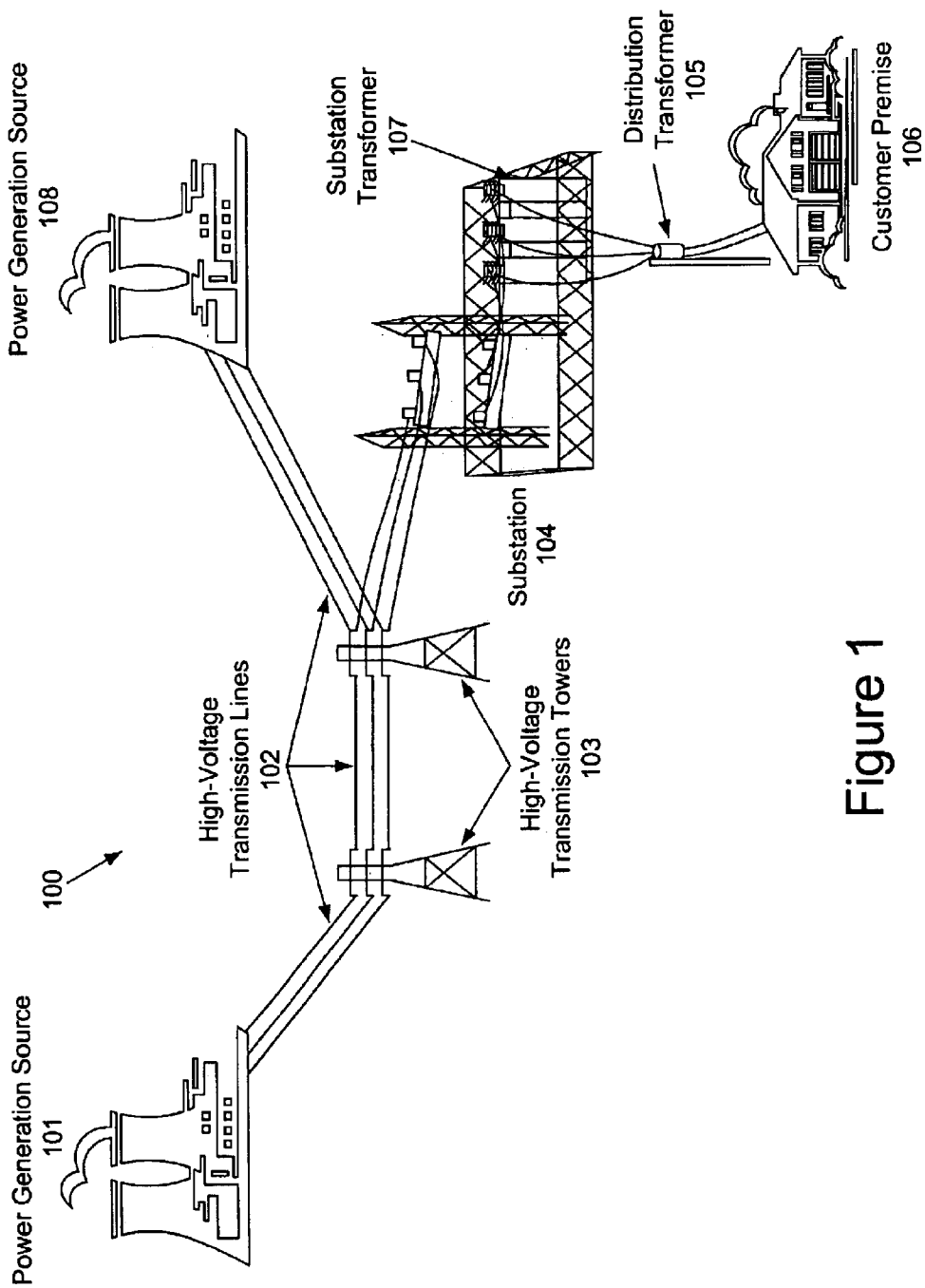
FIG. 1 is a block diagram of an electric power transmission system.

FIG. 1 is a block diagram of an electric power transmission system 100. Generally, electric power transmission system 100 has three major components: the generating facilities that produce the electric power, the transmission network that carries the electric power from the generation facilities to the distribution points, and the distribution system that delivers the electric power to the consumer. As shown in FIG. 1, a power generation source 101 is a facility that produces electric power. Power generation source 101 includes a generator (not shown) that creates the electrical power. The generator may be a gas turbine or a steam turbine operated by burning coal, oil, natural gas, or a nuclear reactor, for example. In each case, power generation source 101 provides a three-phase alternating current (AC) power. The AC power typically has a voltage as high as approximately 25,000 volts.

A transmission substation (not shown) then increases the voltage from power generation source 101 to high-voltage levels for long distance transmission on high-voltage transmission lines 102. Typical voltages found on high-voltage transmission lines 102 range from 69 to 800 kilovolts (kV). High-voltage transmission lines 102 are supported by high-voltage transmission towers 103. High-voltage transmission towers 103 are large metal support structures attached to the earth, so as to support the transmission lines and provide a ground potential to system 100. High-voltage transmission lines 102 carry the electric power from power generation source 101 to a substation 104. A typical maximum distance between power generation source 101 and substation 104 is approximately three hundred miles. High-voltage transmission lines 102 between power generation source 101 and substation 104 typically are referred to as the "grid."

In three-phase voltage systems, typical for high-voltage transmission lines, there is one individual conductor for each phase. Therefore, there are three conductors for each three-phase high-voltage "circuit." Also, although not specifically shown in FIG. 1, it should be appreciated that high-voltage transmission towers 103 may support many individual three-phase circuits. In fact, due to aesthetic concerns and property restrictions, high-voltage transmission towers 103 may be required to carry many independent three-phase circuit sets. These multiple circuits may be in parallel if they carry power to and from the same power generation sources. Alternatively, these multiple circuits, although supported by the same high-voltage transmission tower, may carry power to and from different power generation sources, and thus not be in parallel electrically. In either case, the term "crossover" fault is used throughout to refer to a fault caused by one or more conductors of one circuit making electrical contact with one or more conductors of another possibly parallel circuit (i.e., where "parallel" refers to circuits having common endpoints). This is to be distinguished from a single phase-to-ground fault, which commonly describes one conductor of a particular circuit making electrical contact with a grounded conductor of the same circuit. This is also to be distinguished from a phase-to-phase fault, which commonly describes one conductor of a particular circuit making electrical contact with another conductor of the same circuit. Generally, substations act as a distribution point in system 100 and a point at which voltages are stepped-down to reduced voltage levels. Substation 104 converts the power on high-voltage transmission lines 102 from transmission voltage levels to distribution voltage levels. In particular, substation 104 uses transformers 107 that step down the transmission voltages from the 69–800 kV level to distribution voltages that typically are less than 35 kV. In addition, substation 104 may include an electrical bus (not shown) that serves to route the distribution level power in multiple directions. Furthermore, substation 104 often includes circuit breakers and switches (not shown) that permit substation 104 to be disconnected from high-voltage transmission lines 102, when a fault occurs on the lines.

Substation 104 typically is connected to a distribution transformer 105. Distribution transformer 105 may be a pole-top transformer located on a telephone or electric pole, or a pad-mounted transformer located on the ground. Voltage levels between substation 104 and distribution transformer 105 typically are less than 10 kV. Distribution transformer 105 steps down the voltage to levels required by a customer premise 106, for example. Such voltages typically range from 120 volts to 480 volts. Also, distribution transformer 105 may function to distribute one, two or three of the three phase currents to customer premise 106, depending upon the demands of the user.

Crossover Fault Classification System

Figure 2:
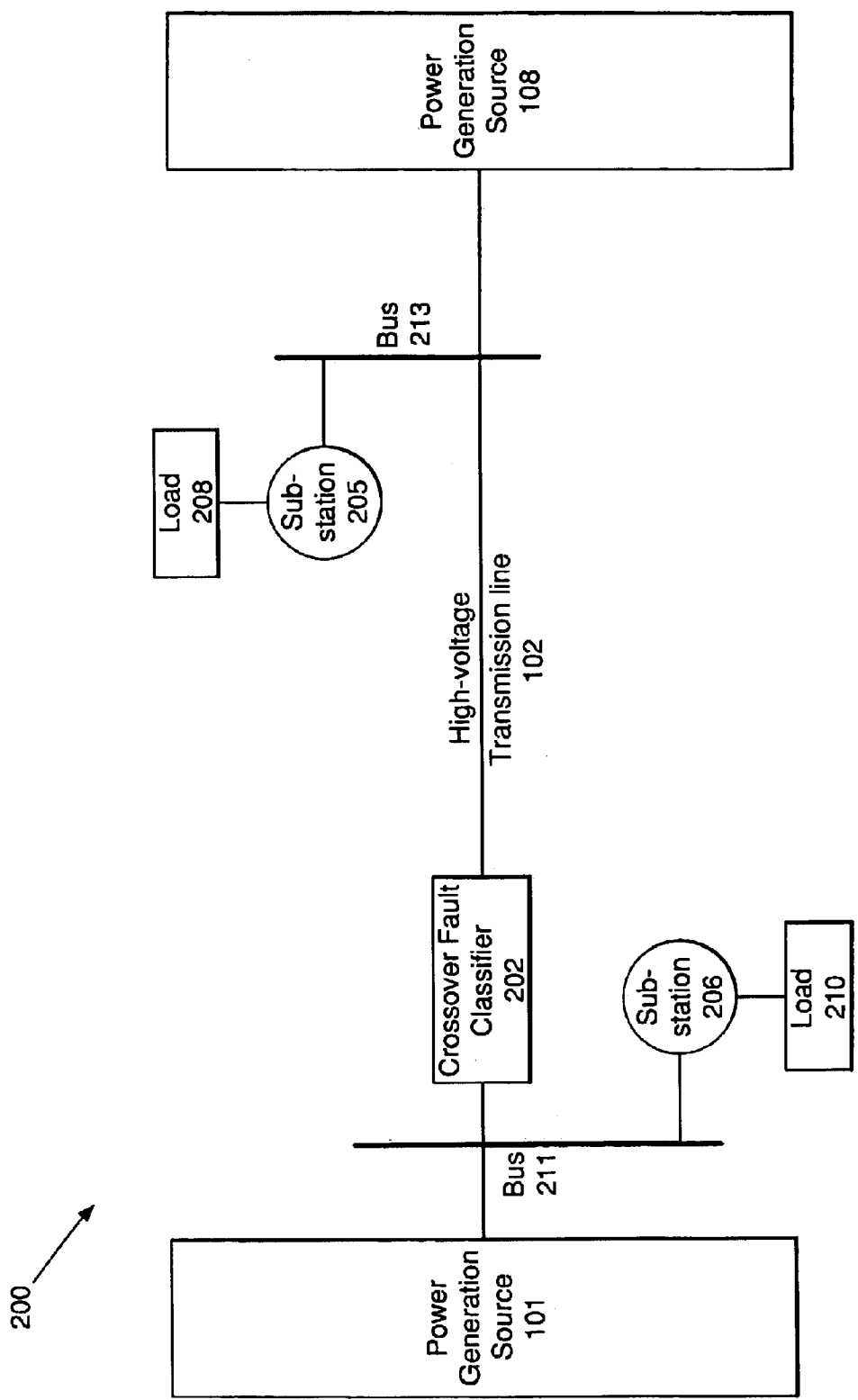
FIG. 2 is a block diagram of a crossover fault classifier system, according to the invention.

FIG. 2 is a block diagram of a crossover fault classifier system 200, according to the invention. It should be appreciated that although crossover fault classifier system 200 may include other components, system 200 describes the basic components necessary for an understanding and explanation of the invention.

As shown in FIG. 2, power generation source 101 is coupled to a power generation source 108 via high-voltage transmission line 102. In a typical power transmission system, various medium or high voltage buses are coupled to the high-voltage transmission line in order to provide power to various loads via distribution stations. For example, a bus 211 directs power to a substation 206. As discussed with reference to substation 104 in FIG. 1, substation 206 distributes power of various voltage levels to a load 210. Load 210 may be any industrial, commercial, or residential power-consuming unit, for example, customer premise 106, as shown in FIG. 1. In a high-voltage transmission system, bus 211 typically is a three-phase voltage bus. System 200 also illustrates another bus serving another load. A bus 213 distributes power to a load 208 via a substation 205. Again, it should be appreciated that system 200 provides a basic block diagram of a power transmission system for purposes of the invention, and is not meant to be exclusive of the components of such a system.

System 200 further includes a crossover fault classifier 202 in communication with high-voltage transmission line 102. In particular, crossover fault classifier 202 receives power via an input from power generation source 108 side of system 200, and from power generation source 101 side of system 200. Although crossover fault classifier 202 is shown in direct communication with high-voltage transmission line 102, it should be appreciated that crossover fault classifier 202 may communicate with high-voltage transmission line 102 via other communication lines (not shown). Also, although crossover fault classifier 202 is shown in communication with high-voltage transmission line 102, it should be appreciated that crossover fault classifier 202 may be located at any location within system 200. Moreover, it should be appreciated that there may be multiple crossover fault classifiers located throughout system 200. As will be discussed, crossover fault classifier 202 is an intelligent local device that permits a crossover fault to be detected at any location within system 200 without the need for a centralized communication and control. Stated differently, crossover fault classifier 202 permits the determination of a crossover fault from a single location, instead of requiring that the conductors involved in the crossover fault be monitored.

Overview of Crossover Fault Detection Techniques

Certain terminology and designations well known to those skilled in the art will be used throughout the specification. The follow description provides a brief description of such terminology and designations.

Unbalanced electrical systems are typically caused by various types of faults. Such faults may include phase-to-phase faults, phase-to-ground faults, and crossover faults. Crossover faults refer to a fault that occurs between phases of different circuits. The different circuits may be parallel circuits (i.e., carrying power to and from similar sources and destinations) or non-parallel circuits. Similarly, the different circuits may be of the same or different voltage-carrying range.

It is well known to those skilled in the art that Fortescue's Theorem proves that an unbalanced system of (n) related phasors may be resolved into (n) systems of balanced phasors. The balanced phasors, which typically are easier to manipulate mathematically and otherwise, are called symmetrical components of the original phasors. Therefore, in a three-phase system, for example, the three unbalanced phasors (perhaps created by a crossover fault) can be resolved into three balanced systems of phasors. The three balanced sets of components are called "positive-sequence," "negative-sequence," and "zero-sequence" components.

Positive-sequence components are comprised of three phasors that are equal in magnitude and displaced from each other by 120° in phase, and have the same phase sequence as the original components. The positive-sequence components exist even if the original phasors are balanced. Negative-sequence components are comprised of three phasors that are equal in magnitude and are displaced from each other by 120° in phase, and have the same phase sequence as the original components. Zero-sequence components are comprised of three phasors equal in magnitude and with zero phase displacement from each other. Zero and negative-sequence components exist only when the original phasors are unbalanced.

The following uppercase designators will be used throughout to describe the invention to designate physical values:

V—Voltage [complex value]
I—Current [complex value]
Z—Impedance [complex value]
Δ—Change in value from prefault condition [complex value]
R—Resistance (real part of Z) [real value]
X—Reactance (imaginary part of Z) [real value]

The following lowercase designators will be used throughout to describe the invention to designate unfaulted or faulted values:

s—sending end value
m—distance to fault within segment [real value]
a—is equal to $1\angle 120°$ The following subscript designators will be used throughout to describe the invention to designate phase or symmetrical components:

a—Phase a
b—Phase b
c—Phase c
0—Zero sequence (primary circuit)
1—Positive sequence (primary circuit)
2—Negative sequence (primary circuit)
0'—Zero sequence (parallel circuit)
1'—Positive sequence (parallel circuit)
2'—Negative sequence (parallel circuit)
f—Fault point, faulted node, fault location
L—transmission line impedance The following superscript designators will be used throughout to describe the invention as follows:

f—Calculated fault value at the sending or receiving terminal
p—Calculated prefault value at the sending or receiving terminal The following designators will be used throughout to describe the invention to designate parts of complex values:

Re( . . . )—real part (Cartesian coordinates)
Im( . . . )—imaginary part (Cartesian coordinates)
| |—absolute value (polar coordinates)
∠—argument, angle (polar coordinates)

Figure 3A:
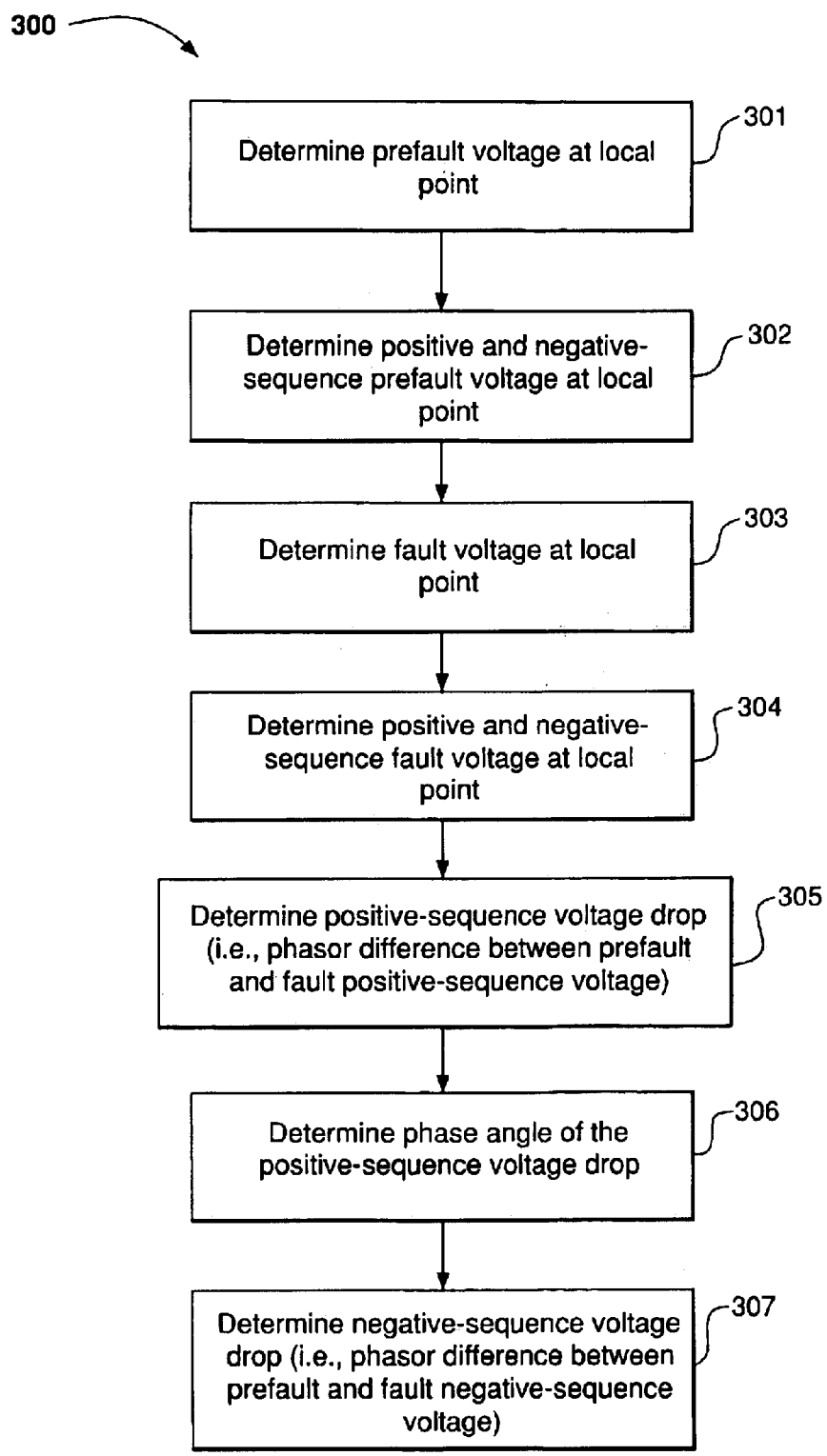
FIGS. 3A and 3B provide a flow diagram describing a method for classifying a crossover fault, according to the invention.
Figure 3B:
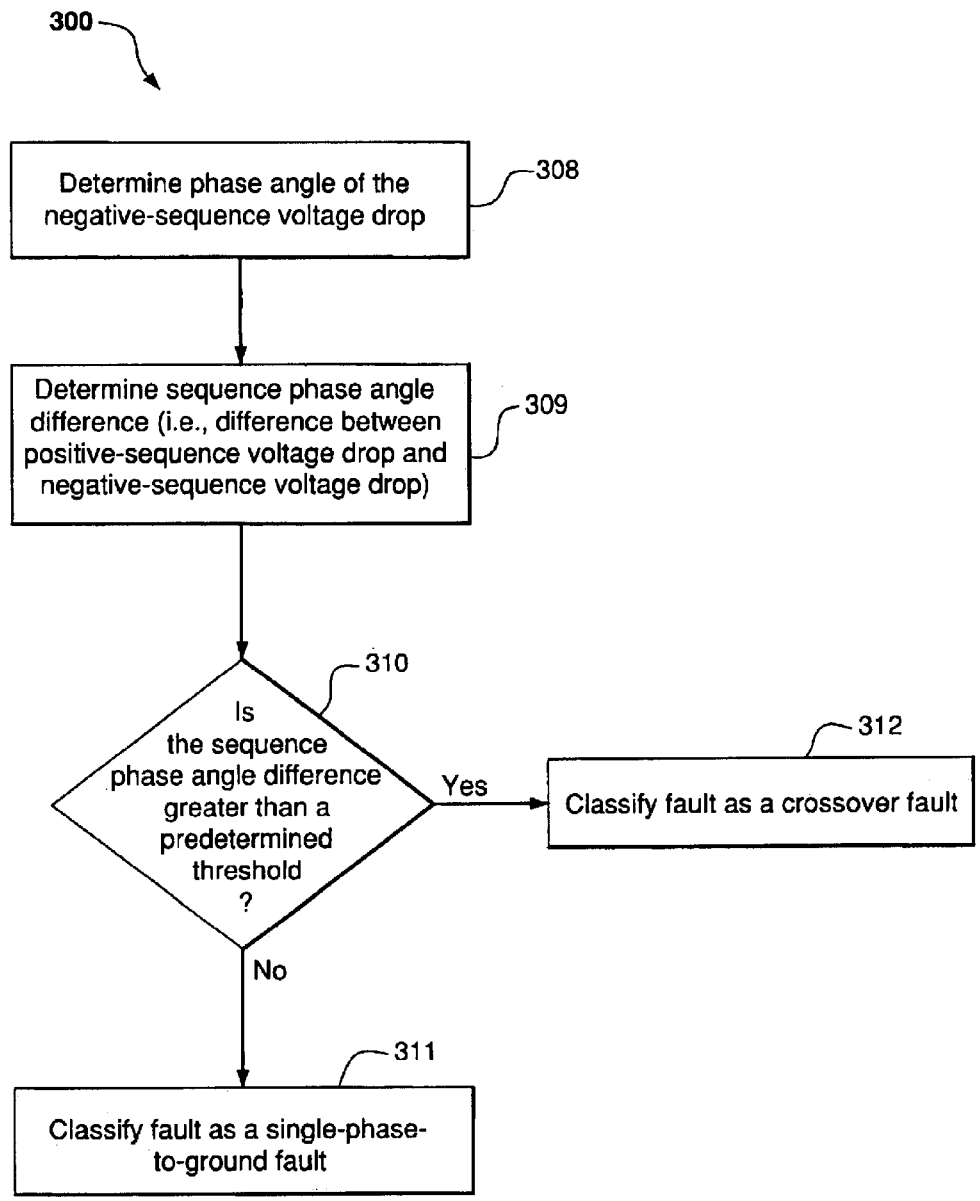

Classifying Crossover Faults using Phase Relationships Between Positive and Negative-Sequence Voltage Drops FIGS. 3A and 3B provide a flow diagram describing a method 300 for classifying a crossover fault. Method 300 is a function of the phase relationships between the positive and the negative-sequence voltage drop. In order to properly distinguish a crossover fault (i.e., a fault between two independent circuits) from a phase-to-phase fault on one circuit (i.e., a fault between two conductors of the same three-phase circuit), method 300 assumes that an existing detection technique and/or algorithm has distinguished the fault as having characteristics of a single-phase-to-ground fault, and not a phase-to-phase fault. Method 300 then operates to further determine whether the fault is in fact a crossover fault or a single-phase-to-ground fault, as perceived by the existing detection technique. Although the existing detection technique may be distinct from the inventive technique, it should be appreciated that the existing detection technique may be incorporated within the same components as the inventive technique (e.g., crossover fault classifier 202). Also, where the inventive technique is performed by computer-execitable instructions, the existing detection technique may be a part of the same computer-executable instructions, located on the same or distinct computer-readable mediums.

As shown in FIG. 3A, in step 301 a prefault voltage is determined at a local point (e.g., crossover fault detector 202). The prefault voltage may be represented by $$Vs_a^p \; Vs_b^p \; Vs_c^p,$$

where Vs is the voltage at the sending end of high-voltage transmission line 102, p designates the prefault values and a, b, and c represent each phase of the three-phase circuit. In step 302, the positive and negative-sequence prefault voltages are determined at crossover fault detector 202 as follows:

$$Vs_1^p = \frac{1}{3}(Vs_a^p + aVs_b^p + a^2Vs_c^p)$$

$$Vs_2^p = \frac{1}{3}(Vs_a^p + a^2Vs_b^p + aVs_c^p);$$

where 1 designates the positive-sequence component of the prefault voltage at the sending end, and 2 designates the negative-sequence component of the prefault voltage at the sending end. It should be appreciated that the term "sending end" may be used to describe one end of transmission line 102 monitored by crossover fault classifier 202, and that the term "receiving end" may be used to describe an opposite end of transmission line 102. Therefore, as shown in FIG. 2, crossover fault classifier 202 is capable of measuring electrical properties from both ends of transmission line 102. For example, referring to FIG. 2, power generation source 101 may represent the sending end of transmission line 102 and power generation source 108 may represent the receiving end of transmission line 102.

In step 303, a fault voltage is determined at crossover fault detector 202. The fault voltage may be represented by $$Vs_a^f\ Vs_b^f\ Vs_c^f,$$

where Vs is the voltage at the sending end of high-voltage transmission line 102, and f designates the fault values. In step 304, the positive and negative-sequence drop of the fault voltage are determined at crossover fault detector 202, as follows:

$$Vs_1^f = \frac{1}{3}(Vs_a^f + aVs_b^f + a^2Vs_c^f)$$

$$Vs_2^f = \frac{1}{3}(Vs_a^f + a^2Vs_b^f + aVs_c^f)$$

where 1 designates the positive-sequence component of the fault voltage at the sending end, and 2 designates the negative-sequence component of the fault voltage at the sending end. In step 305, a positive-sequence voltage drop is determined. The positive-sequence voltage drop is calculated as the phasor difference between prefault and fault positive-sequence voltages, as follows:

$$\Delta Vs_1 = Vs_1^f - Vs_1^p$$

$$\Delta Vs_2 = Vs_2^f - Vs_2^p$$

where $\Delta Vs_1$ designates the positive-sequence voltage drop. In step 306, the phase angle of the positive-sequence of voltage drop (determined in step 305) is determined, as follows:

$$\angle \Delta Vs_1 = \tan^{-1}(Im(\Delta Vs_1)/Re(\Delta Vs_1))$$

In step 307, the negative-sequence voltage drop is determined. The negative-sequence voltage drop is calculated as the phasor difference between the prefault and fault negative-sequence voltage, as follows:

$$\Delta Vs_2 = Vs_2^f - Vs_2^p$$

where $\Delta Vs_2$ represents the negative-sequence voltage drop.

As shown in FIG. 3B, the phase angle of the negative-sequence voltage drop (determined in step 307) is determined, in step 308, as follows:

$$\angle \Delta Vs_2 = \tan^{-1}(Im(\Delta Vs_2)/Re(\Delta Vs_2))$$

In step 309, the sequence phase angle difference is determined. The sequence phase angle difference represents the difference between the positive-sequence voltage drop (determined in step 305) and the negative-sequence voltage drop (determined in step 307), as follows:

$$\angle \Delta V = \angle \Delta Vs_1 - \angle \Delta Vs_2$$

In step 310 it is determined whether the sequence phase angle difference (determined in step 309) is greater than a predetermined threshold. For example, in the context of three phase circuits the predetermined phase angle difference threshold may be established at± 3° to 5°. Therefore, if the determined phase angle difference is greater than the predetermined threshold, then the fault may be classified as a crossover fault, in step 312. If, on the other hand, the phase angle difference is not greater than the predetermined threshold, then the fault may be classified as a single-phase-to-ground fault in step 311.

It should be appreciated that the method described above may be accomplished using computer-readable instructions located on a computer-readable medium. The computer-readable medium may be located within crossover fault classifier 202, but is not so limited. Alternatively, the computer-readable medium may be located within structures that currently exist on high voltage transmission lines (e.g., existing electrical relays). Accordingly, the measurements (e.g., prefault and fault values) and the calculations (e.g., sequence components) may be accomplished at any point in the electrical transmission network, including crossover fault classifier 202.

Classifying Crossover Faults using Zero-Sequence Voltage Drop Magnitude

Figure 4A:
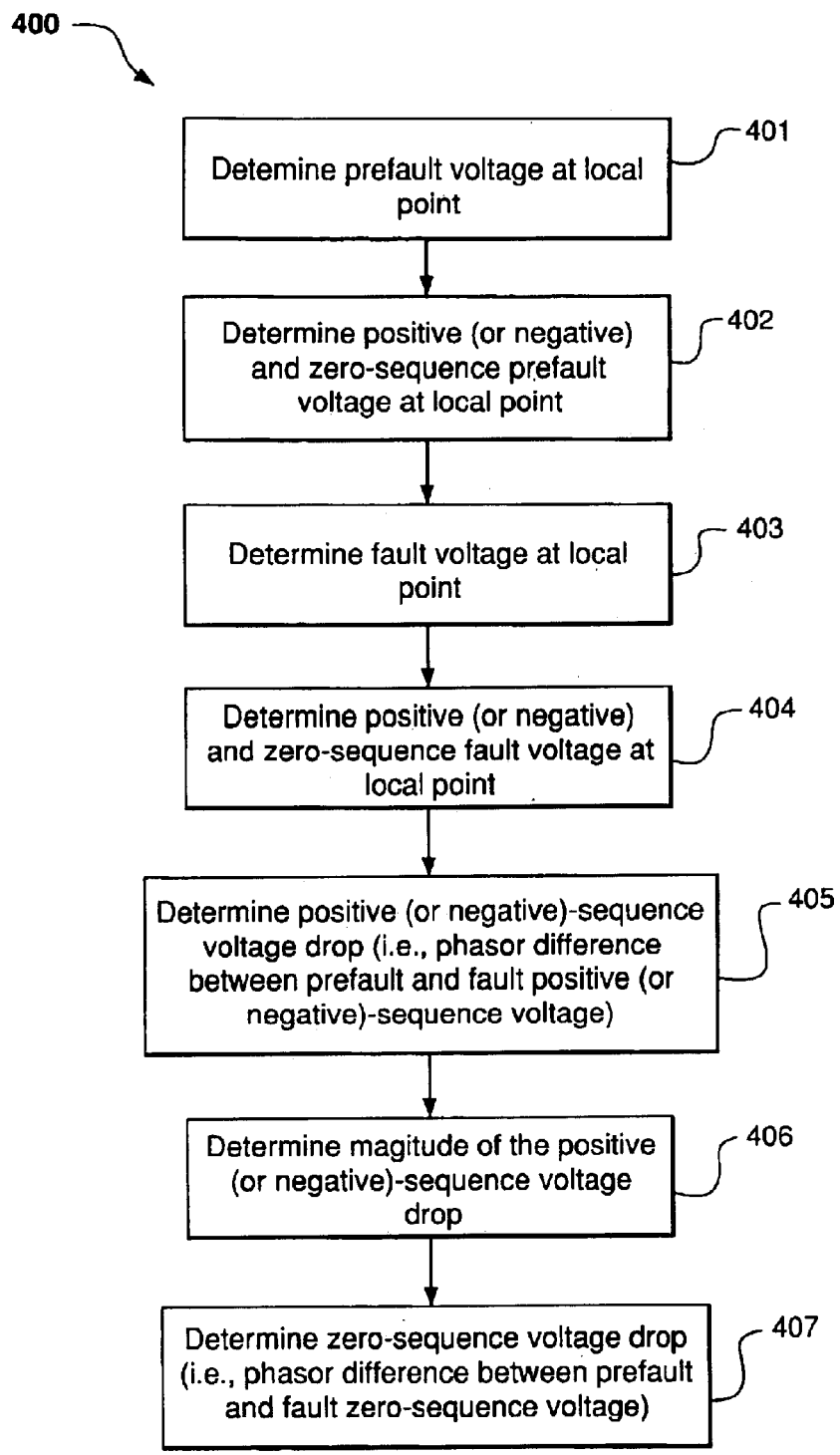
FIGS. 4A and 4B provide a flow diagram describing another method for classifying a crossover fault, according to the invention.
Figure 4B:
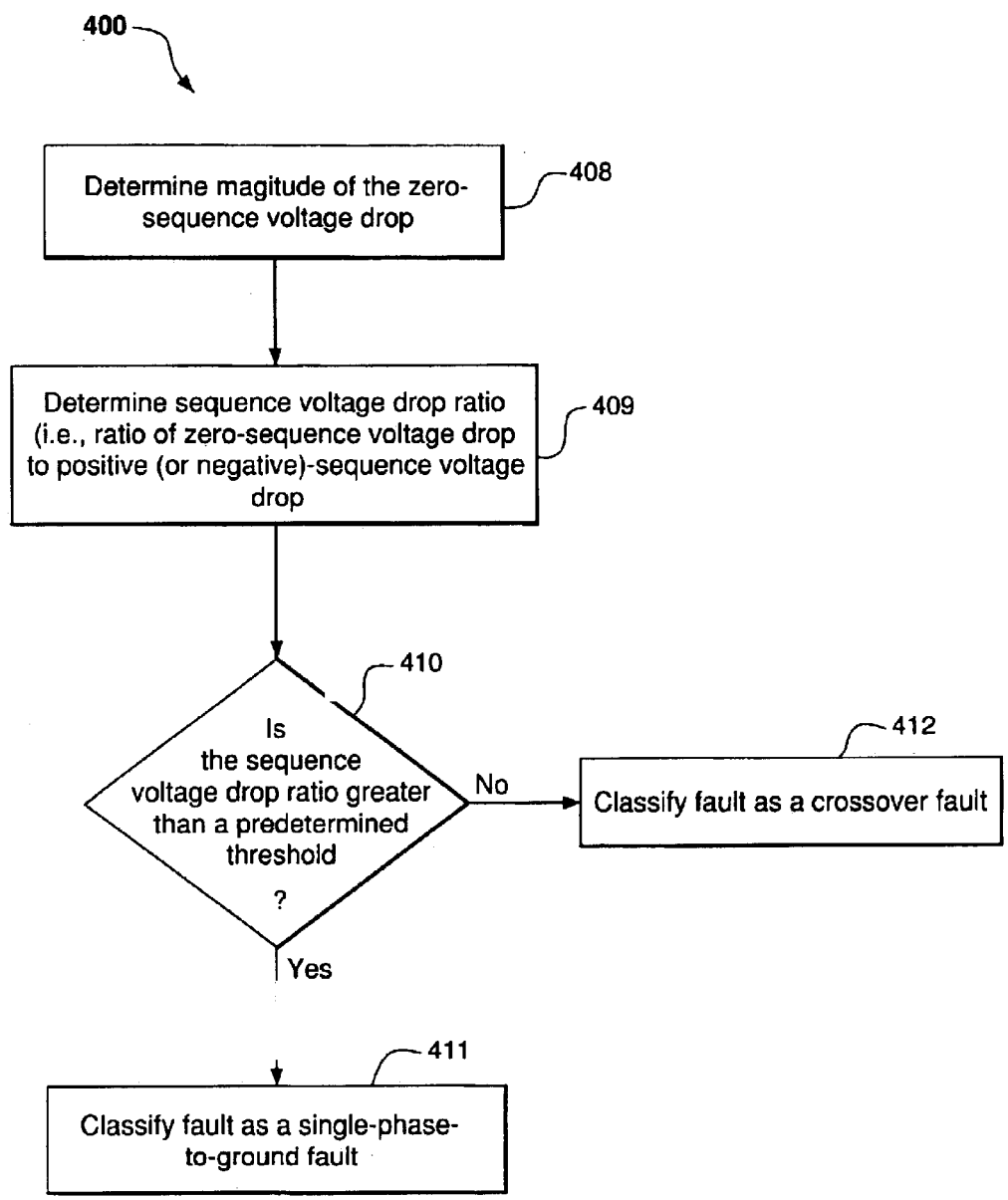

FIGS. 4A and 4B provide a flow diagram describing another method for classifying a crossover fault. Method 400 is a function of the magnitude of the zero-sequence voltage drop associated with the fault. In order to properly distinguish a crossover fault (i.e., a fault between two independent circuits) from a phase-to-phase fault on one circuit (i.e., a fault between two conductors of the same three-phase circuit), method 400 assumes that an existing detection technique and/or algorithm has distinguished the fault as having characteristics of a single-phase-to-ground fault, and not a phase-to-phase fault. Method 400 then operates to further determine whether the fault is in fact a crossover fault or a single-phase-to-ground fault, as perceived by the existing detection technique. Although the existing detection technique may be distinct from the inventive technique, it should be appreciated that the existing detection technique may be incorporated within the same components as the inventive technique (e.g., crossover fault classifier 202). Also, where the inventive technique is performed by computer-executable instructions, the existing detection technique may be a part of the same computer-executable instructions, located on the same or distinct computer-readable mediums.

As shown in FIG. 4A, in step 401, a prefault voltage is determined at a local point (e.g., crossover fault detector 202). The prefault voltage may be represented by $$Vs_a^p \; Vs_b^p \; Vs_c^p,$$

where Vs is the voltage at the sending end of high-voltage transmission line 102, p designates the prefault values and a, b, and c represent each phase of the three-phase circuit. In step 402, a positive and the zero-sequence prefault voltage is determined at crossover fault detector 202, as follows:

$$Vs_1^p = \frac{1}{3}(Vs_a^p + aVs_b^p + a^2 Vs_c^p)$$

$$Vs_0^p = \frac{1}{3}(Vs_a^p + Vs_b^p + Vs_c^p)$$

where 0 designates the zero-sequence component. Alternatively, instead of using the positive-sequence values in method 400, it should be appreciated that the negative-sequence values may be used instead of the positive-sequence values. However, method 400 will be described in the context of the positive-sequence values.

In step 403, a fault voltage is determined at the crossover fault detector 202. The fault voltage may be represented by $$Vs_a^f \; Vs_b^f \; Vs_c^f,$$

where Vs is the voltage at the sending end of high-voltage transmission line 102, and f designates the fault values. In step 404, the positive and the zero-sequence components of the fault voltage are determined at crossover fault detector 202 as follows:

$$Vs_1^f = \frac{1}{3}(Vs_a^f + aVs_b^f + a^2 Vs_c^f)$$

$$Vs_0^f = \frac{1}{3}(Vs_a^f + Vs_b^f + Vs_c^f)$$

In step 405, a positive-sequence voltage drop is determined. The positive-sequence voltage drop represents the phasor difference between the prefault and fault positive-sequence voltage, as follows:

$$\Delta Vs_1 = Vs_1^f - Vs_1^p$$

In step 406, the magnitude of the positive-sequence voltage drop is determined, as follows:

$$|\Delta Vs_1| = \sqrt{Re(\Delta Vs_1)^2 + Im(\Delta Vs_1)^2}$$

In step 407, the zero-sequence voltage drop is determined. The zero-sequence voltage drop is represented by the phasor difference between the prefault and fault zero-sequence voltage, as follows:

$$\Delta Vs_0 = Vs_0^f - Vs_0^p$$

As shown in FIG. 4B, in step 408, method 400 determines a magnitude of the zero-sequence voltage drop (determined in step 407), as follows:

$$|\Delta Vs_0| = \sqrt{Re(\Delta Vs_0)^2 + Im(\Delta Vs_0)^2}$$

In step 409, a voltage drop ratio is determined. The voltage drop ratio is represented by the ratio of the zero-sequence voltage drop (determined in step 407) and the positive-sequence voltage drop (determined in step 405), as follows:

$$|\Delta V| = |\Delta Vs_0| / |\Delta Vs_1|$$

In step 410, it is determined whether the sequence drop voltage drop ratio (determined in step 409) is greater than a predetermined threshold. The predetermined threshold may be any value selected based on the nature and characteristics of the power transmission system. For example, because crossover faults typically involve one phase from each circuit, the zero-sequence voltage does not undergo significant change. For single-phase-to-ground faults, however, the zero-sequence voltage is significantly similar to the other sequence voltages. Therefore, if the change in magnitude in the zero-sequence voltage, for example, is relatively small with respect to the positive and/or negative-sequence voltage, it may be determined that a crossover fault has occurred. It should be appreciated that the change in magnitude of the zero-sequence voltage is just one example of a threshold that may be used to distinguish a crossover fault.

It follows, therefore, that because $VS_0$ cannot be greater than $VS_1$ if the sequence voltage drop ratio is less than the predetermined threshold then the fault is classified as a crossover fault, in step 412. If, on the other hand, the sequence voltage ratio is greater than the predetermined threshold, the fault is classified as a single-phase-to-ground fault, in step 411.

It should be appreciated that the method described above may be accomplished using computer-readable instructions located on a computer-readable medium. The computer-readable medium may be located within crossover fault classifier 202, but is not so limited. Alternatively, the computer-readable medium may be located within structures that currently exist on high voltage transmission lines (e.g., existing electrical relays). Accordingly, the measurements (e.g., prefault and fault values) and the calculations (e.g., sequence components) may be accomplished at any point in the electrical transmission network, including crossover fault classifier 202.

Classifying Crossover Faults Using Summation of Sequence Voltages

Figure 5:
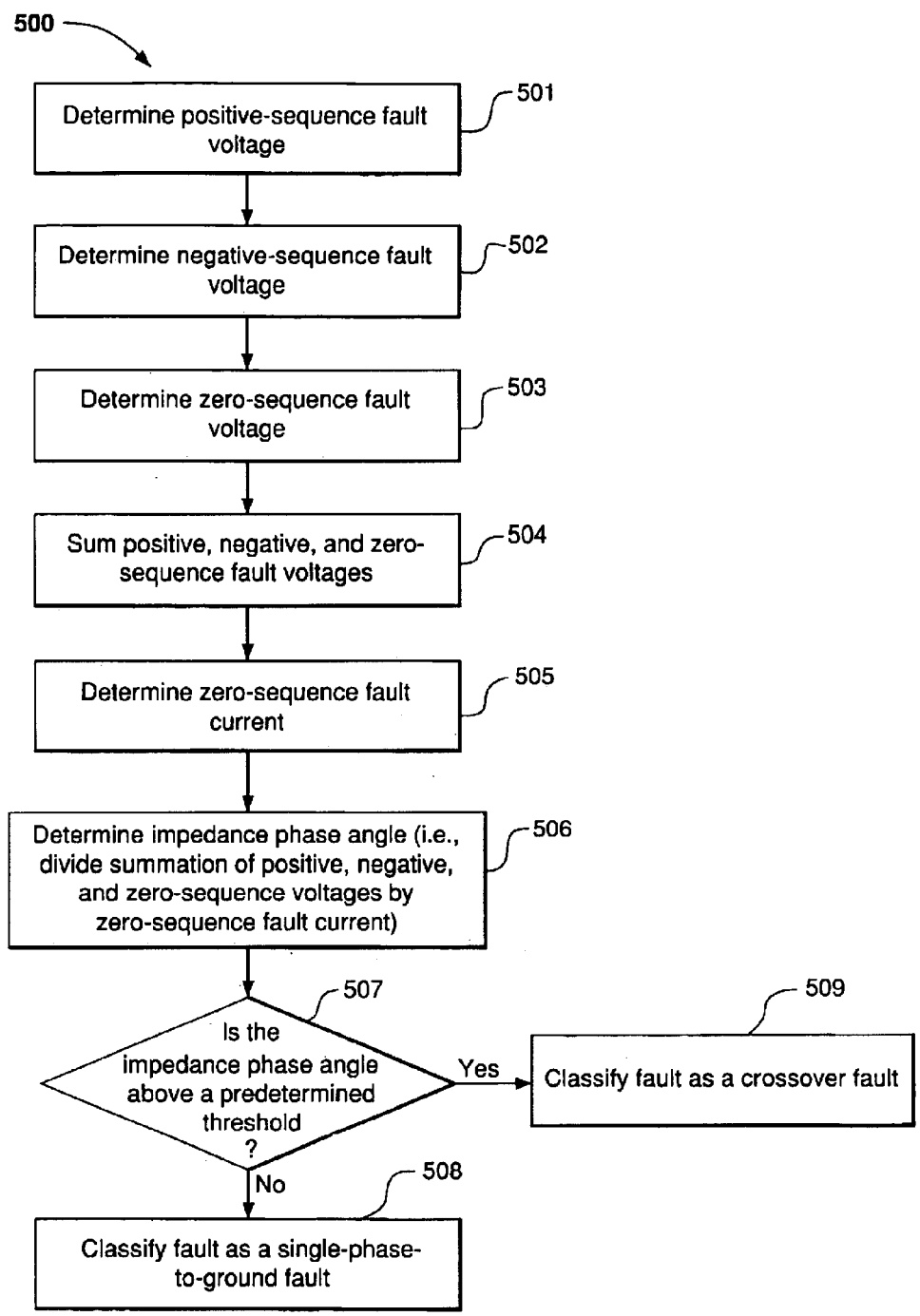
FIG. 5 provides a flow diagram describing another method for classifying a crossover fault, according to the invention.

FIG. 5 provides a flow diagram describing another method for classifying a crossover fault. Method 500 is a function of the summation of sequence voltages at the fault point. In order to properly distinguish a crossover fault (i.e., a fault between two independent circuits) from a phase-to-phase fault on one circuit (i.e., a fault between two conductors of the same three-phase circuit), method 500 assumes that an existing detection technique and/or algorithm has distinguished the fault as having characteristics of a single-phase-to-ground fault, and not a phase-to-phase fault. Method 500 then operates to further determine whether the fault is in fact a crossover fault or a single-phase-to-ground fault, as perceived by the existing detection technique. Although the existing detection technique may be distinct from the inventive technique, it should be appreciated that the existing detection technique may be incorporated within the same components as the inventive technique (e.g., crossover fault classifier 202). Also, where the inventive technique is performed by computer-executable instructions, the existing detection technique may be a part of the same computer-executable instructions, located on the same or distinct computer-readable mediums.

The following equations illustrate the difference in sequence voltage relationships for a single-phase-to-ground fault (e.g., phase (a) to ground) and a crossover fault (e.g., phase (a) to phase (b')), where' indicates the non-primary circuit). For a single phase (a) to ground fault, the relationships between the sequence voltages may be represented as follows:

$$3 \cdot R_f = \frac{V_{f0} + V_{f1} + V_{f2}}{I_f}; \text{ where } I_f = I_{f0} = I_{f1} = I_{f2}$$

For a crossover fault, the relationships between the sequence voltages may be represented as follows:

$$3 \cdot R_f = \frac{(V_{f0} + V_{f1} + V_{f2}) - (V_{f0'} + a^2 V_{f1'} + a V_{f2'})}{I_f};$$

where $I_f = I_{f0} = I_{f1} = I_{f2} = -I_{f0'} = -a^2 I_{f1'} = -a I_{f2'}$.

As shown in FIG. 5, method 500 begins by determining the positive-sequence component of the voltage at the fault, in step 501, as follows:

$$V_{f1} = Vs_1^f - m \cdot Z_{L1} \cdot Is_1^f$$

where m is a real value representing a distance to the fault from the measurement point. In step 502, the negative-sequence component of the voltage at the fault location is determined, as follows:

$$V_{f2} = Vs_2^f - m \cdot Z_{L0} \cdot Is_2^f$$

In step 503, the zero-sequence component of the voltage at the fault is determined, as follows:

$$V_{f0} = Vs_0^f - m \cdot Z_{L0} \cdot Is_0^f$$

The positive, negative, and zero-sequence fault components (determined in steps 501, 502 and 503, respectively) may be determined by crossover fault detector 202. In step 504, the positive, negative and zero-sequence fault voltages are added together, as follows:

$V_f = V_{f0} + V_{f1} + V_{f2}$ $(V_f = V_{f0} + a^2 V_{f1} + a V_{f2}$ for phase (b) faults)

$(V_f = V_{f0} + a V_{f1} + a^2 V_{f2}$ for phase (c) faults)

In step 505, the zero-sequence component of the fault current is determined, as follows:

$$I_{f0} = Is_0^f + Ir_0^f;$$

where $Is_0$ is the zero sequence component at the sending end, and $Ir_0$ is the zero sequence component at the receiving end.

In step 506, the impedance phase angle is determined. The impedance phase angle represents the summation of the positive, negative, and zero-sequence voltages divided by the zero-sequence fault current (determined in step 505), and is determined as follows:

$Z = \angle(V_f / I_{f0})$

In step 507, it is determined whether the impedance phase angle (determined in step 506) is above a predetermined threshold. Typically, in a three-phase system, the predetermined impedance phase angle threshold will be ±3° to 5°, for example. If the impedance phase angle is above the predetermined threshold, the fault will be classified as a crossover fault, in step 509. If, on the other hand, the impedance phase angle is below the predetermined threshold, the fault will be classified as a single-line-to-ground fault, in step 508.

Also, whether the fault impedance is a complex or real value may signify whether the fault is a crossover or single-phase-to-ground fault. In particular, when the sum of the sequence voltages (i.e., positive, negative and zero) divided by the fault current is a complex value, due to the effect from the sequence voltages on the parallel circuit, and thus the fault may be classified as a crossover fault. On the other hand, when the sum of the sequence voltages (i.e., positive, negative and zero) divided by the fault current is a real value, the fault may be classified as a single-phase-to-ground fault. A real value for the crossover fault may be obtained by subtracting the sum of the sequence voltages on the secondary circuit from the sum of the sequence voltages on the primary circuit, and then dividing by the fault current.

It should be appreciated that the method described above may be accomplished using computer-readable instructions located on a computer-readable medium. The computer-readable medium may be located within crossover fault classifier 202, but is not so limited. Alternatively, the computer-readable medium may be located within structures that currently exist on high-voltage transmission lines (e.g., existing electrical relays). Accordingly, the measurements (e.g., prefault and fault values) and the calculations (e.g., sequence components) may be accomplished at any point in the electrical transmission network, including crossover fault classifier 202.

Classifying Crossover Faults Using Phase Voltage and Current Values

Figure 6:
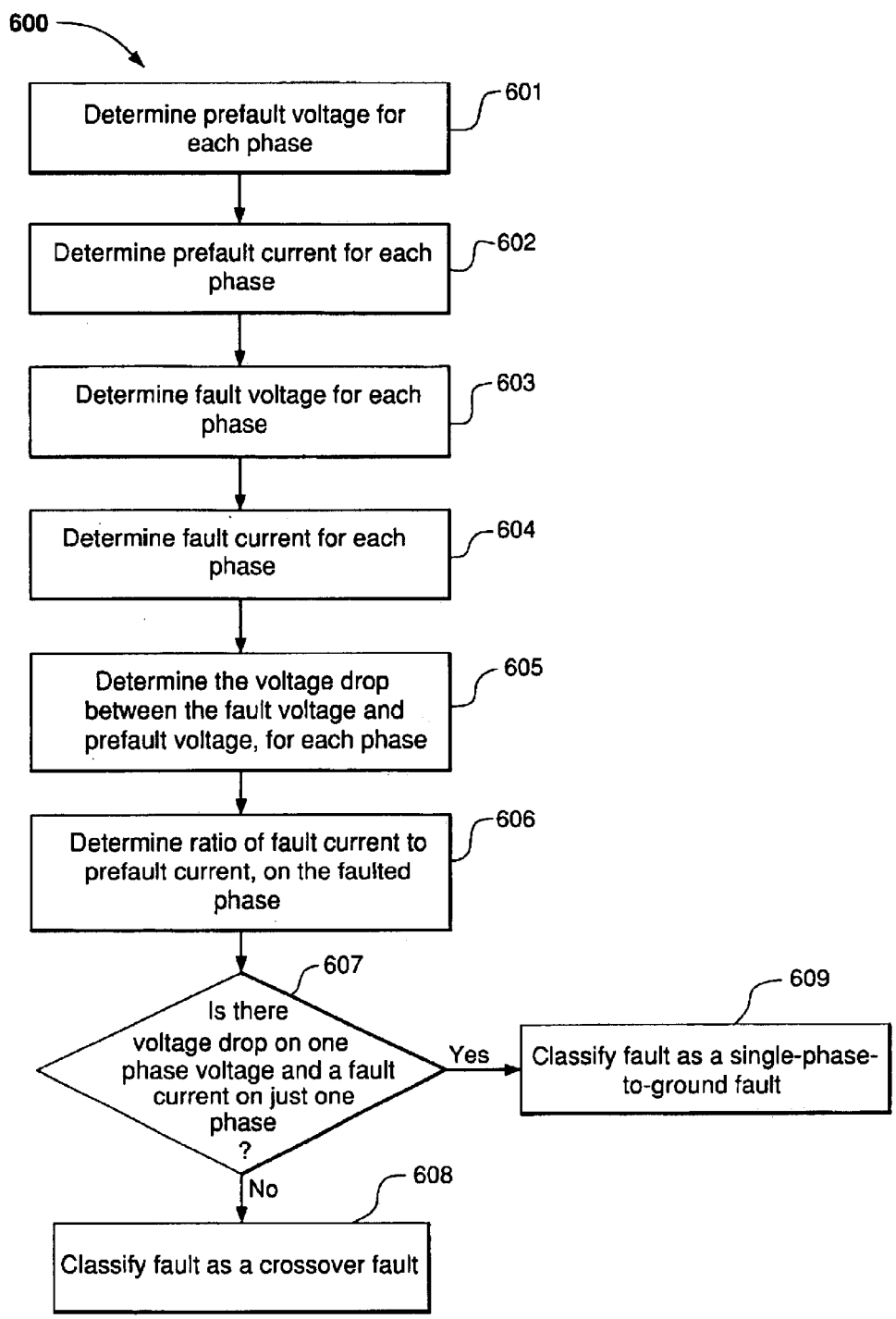
FIG. 6 provides a flow diagram describing another method for classifying a crossover fault, according to the invention.

FIG. 6 is a flow diagram describing another method for classifying a crossover fault. As will be discussed, method 600 is a function of the phase voltage and current values. In order to properly distinguish a crossover fault (i.e., a fault between two independent circuits) from a phase-to-phase fault on one circuit (i.e., a fault between two conductors of the same three-phase circuit), method 600 assumes that an existing detection technique and/or algorithm has distinguished the fault as having characteristics of a single-phase-to-ground fault, and not a phase-to-phase fault. Method 600 then operates to further determine whether the fault is in fact a crossover fault or a single-phase-to-ground fault, as perceived by the existing detection technique. Although the existing detection technique may be distinct from the inventive technique, it should be appreciated that the existing detection technique may be incorporated within the same components as the inventive technique (e.g., crossover fault classifier 202). Also, where the inventive technique is performed by computer-executable instructions, the existing detection technique may be a part of the same computer-executable instructions, located on the same or distinct computer-readable mediums.

Method 600 operates by analyzing the phase voltage and current values, where the primary and secondary circuit lines have common buses at both ends of the lines (i.e., in parallel). In this case, when a significant drop in voltage occurs on two the three phase voltages and when the fault current appears on one phase, the fault may be classified as a crossover fault. For a single-phase-to-ground fault, however, the fault current is detected on one phase, but the voltage drop appears on one phase. Method 600 is especially pertinent to faults with smaller fault resistance, such that the voltage drops on the phase voltages are large enough to be detected.

As shown in FIG. 6, method 600 begins by determining a prefault voltage for each phase, in step 601, designated as $$Vs_a^p \ Vs_b^p \ Vs_c^p.$$

In step 602, a prefault current is determined for each phase, designated as $$Is_a^p \ Is_b^p \ Is_c^p.$$

In step 603, a fault voltage is determined for each phase, designated as $$Vs_a^f \ Vs_b^f \ Vs_c^f.$$

In step 604, a fault current is determined for each phase, designated as $$Is_a^f \ Is_b^f \ Is_c^f.$$

In step 605, the voltage drop between the fault voltage and the prefault voltage is determined for each phase, as follows:

$$\Delta Vs_a = Vs_a^f - Vs_a^p$$
$$\Delta Vs_b = Vs_b^f - Vs_b^p$$
$$\Delta Vs_c = Vs_c^f - Vs_c^p$$

In step 606, a ratio of the fault current to the prefault current is determined on the faulted phase, as follows:

$$\Delta Is_a = \frac{Is_a^f}{Is_a^p}$$

$$\left( \Delta Is_b = \frac{Is_b^f}{Is_b^p} \text{ for fault on phase } (b) \right)$$

$$\left( \Delta Is_c = \frac{Is_c^f}{Is_c^p} \text{ for fault on phase } (c) \right)$$

In step 607, it is determined whether there is a voltage drop on one phase voltage, and whether there is a fault current on just one phase. If there is a voltage drop on one phase voltage and if there is a fault current on just one phase, the fault is classified as a single-phase-to-ground fault, in step 609. If, on the other hand, there is not a voltage drop on one phase voltage, and/or there is not a fault current on just one phase, the fault is classified as a crossover fault, in step 608.

It should be appreciated that the method described above may be accomplished using computer-readable instructions located on a computer-readable medium. The computer-readable medium may be located within crossover fault classifier 202, but is not so limited. Alternatively, the computer-readable medium may be located within structures that currently exist on high-voltage transmission lines (e.g., existing electrical relays). Accordingly, the measurements (e.g., prefault and fault values) and the calculations (e.g., sequence components) may be accomplished at any point in the electrical transmission network, including crossover fault classifier 202.

Selecting Available Crossover Fault Classification Techniques

Figure 7A:
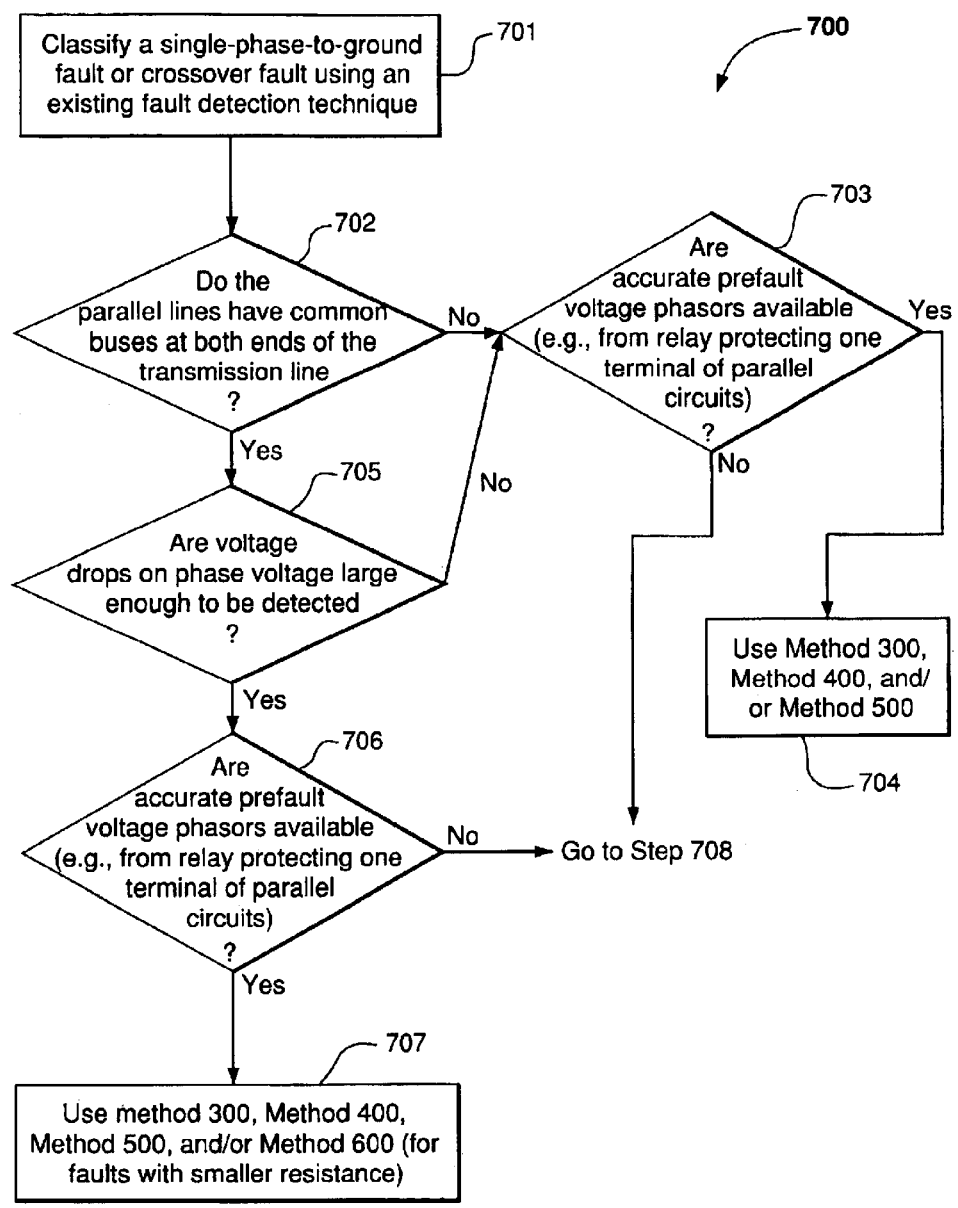
FIGS. 7A and 7B provide a flow diagram for selecting among the appropriate methods described with reference to FIG. 3A through FIG. 6, according to the invention.
Figure 7B:
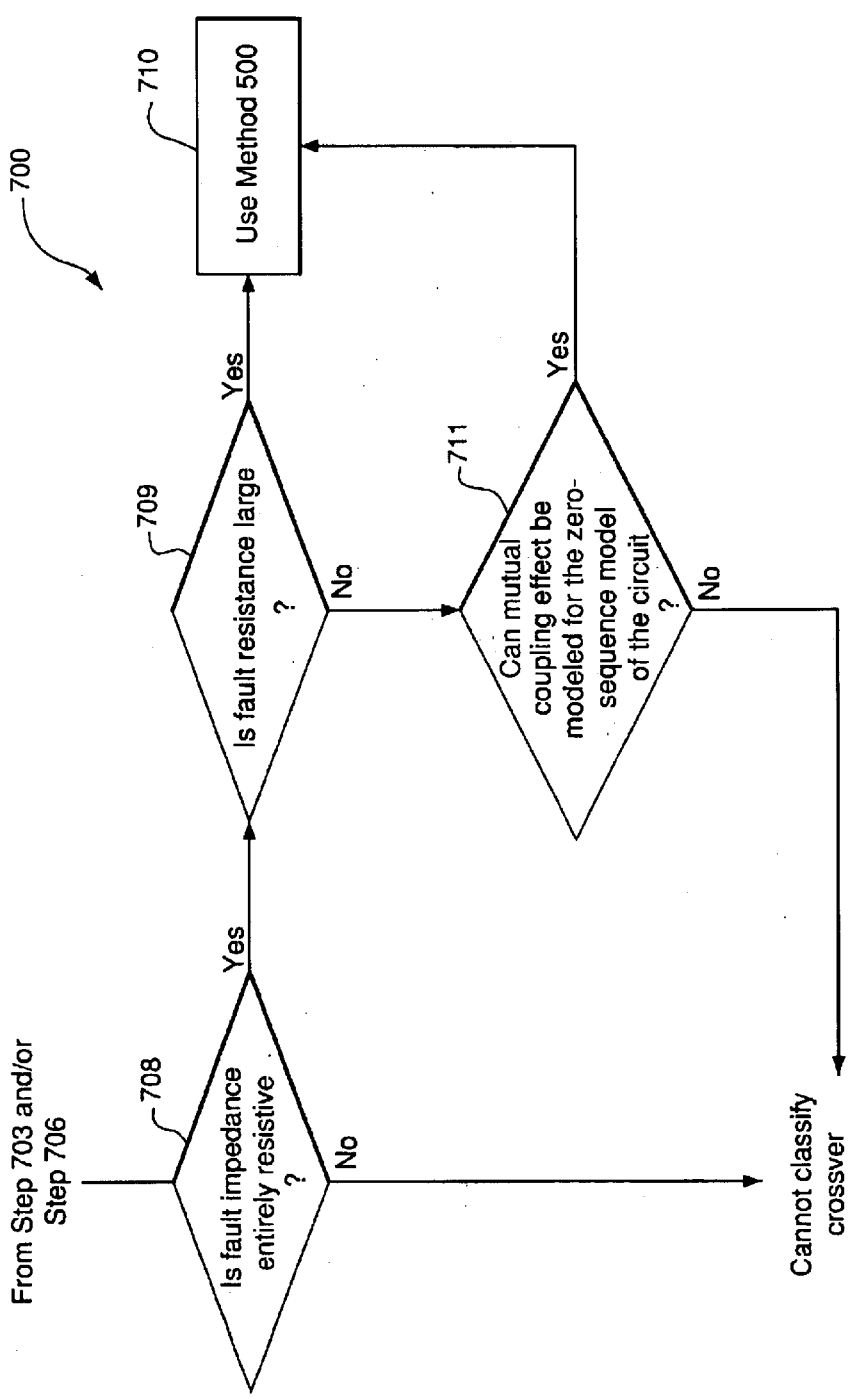

FIGS. 7A and 7B provide a flow diagram for selecting among the appropriate methods shown in FIGS. 3A through 6. It should be appreciated that FIGS. 7A and 7B provide one example of a method for selecting among methods 300, 400, 500, and 600, and that there may be other methods available. Therefore, FIGS. 7A and 7B represent just one example of how certain of methods 300, 400, 500, and 600 may be better suited to classify the crossover fault, depending on the nature of the fault and prefault values received by crossover classifier 202. However, FIGS. 7A and 7B provide just one example, and are not meant to exclude other methods and techniques for selecting among the appropriate methods.

As shown in FIG. 7A, in step 701 a fault is classified as either single-phase-to-ground fault or a crossover fault, to the exclusion of other types of faults (e.g., phase-to-phase fault). Such classification may be accomplished using an existing detection technique (e.g., a two-terminal fault location algorithm), using crossover fault classifier 202, for example. In step 702, it is determined whether the independent three-phase circuits involved in the potential crossover fault have common buses at both ends of their respective transmission lines, such that the independent circuits are in "parallel." If the transmission lines do not have common buses at both ends, in step 703 it is determined whether accurate prefault voltage phasors are available. Accurate prefault voltage phasors may be available from existing relays protecting one terminal of the non-parallel circuits, crossover fault classifier 202, or any other component located in the power transmission system, for example. If accurate prefault voltage phasors are available, methods 300, 400, and/or 500 may be used to classify the fault in step 704. If, on the other hand, accurate prefault voltage phasors are not available in step 703, method 700 moves to 708.

Returning to step 702, if the lines have common buses at both ends of the transmission line, it is determined whether voltage drops on the phase voltage are large enough to be detected in step 705. If the voltage drops are large enough to be detected, it is determined in step 706 whether accurate prefault voltage phasors are available. If in step 706 it is determined that accurate prefault voltage phasors are not available, method 700 moves to step 708. Also, returning to step 705, if it is determined that voltage drops on the phase voltage are not large enough to be detected, method 700 returns to step 703. Returning to step 706, if accurate prefault voltage phasors are available, methods 300, 400, 500, and/or 600 may be used to classify the fault in step 707. Notably, method 600 is an available choice if the existing faults have smaller resistance values.

As shown in FIG. 7B, if it is determined in steps 703 and 706 that no accurate prefault voltages are available, in step 708 it is determined whether the fault impedance is significantly resistive. If the fault impedance is not significantly resistive, method 700 may not be able to classify the fault as a crossover fault. If, on the other hand, in step 708 it is determined that the fault impedance is significantly resistive, in step 709 it is determined whether the resistive fault impedance is large. If the resistive fault impedance is large, method 500 may be used to crossover fault. If, on the other hand, it is determined in step 709 that the resistive portion of the fault impedance is not large, in step 711 it is determined whether the mutual coupling effect can be modeled for the zero-sequence model of the circuit. If the mutual coupling effect cannot be modeled, method 700 may not be able to classify the fault as a crossover fault. If, on the other hand, it is determined in step 711 that a mutual coupling effect can be modeled for the zero-sequence model, method 500 may be used to classify the crossover fault, in step 710.

It should be appreciated that the method described above may be accomplished using computer-readable instructions located on a computer-readable medium. The computer-readable medium may be located within crossover fault detector 202, but is not so limited, and may be located within any component on the electrical transmission system. Alternatively, the computer-readable medium may be located within structures that currently exist on high-voltage transmission lines (e.g., existing electrical relays).

The invention is directed to a system and method for classifying a crossover fault on an electrical power line. It is noted that the foregoing examples have been provided merely for the purpose of explanation and are in no way to be construed as limiting of the invention. While the invention has been described with reference to preferred embodiments, it is understood that the words that have been used herein are words of description and illustration, rather than words of limitations. For example, although a crossover classifier device was described, it will be appreciated that the techniques for classifying crossover fault may be implemented as computer software in any component on an electrical power line capable of conducting such methods. In addition, although the invention often was described by using measured voltages, it should be appreciated that measured currents and/or other electrical characteristics on the electrical transmission line similarly may be used.

Further, although the invention has been described herein with reference to particular means, materials and embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Those skilled in the art will appreciate that various changes and adaptations of the invention may be made in the form and details of these embodiments without departing from the true spirit and scope of the invention as defined by the following claims.

What is claimed is:

1. A method for classifying faults on an electrical power line, comprising:
    measuring a prefault electrical characteristic on the electrical power line;
    determining a positive-sequence component for the prefault electrical characteristic;
    determining a negative-sequence component for the prefault electrical characteristic;
    measuring a fault electrical characteristic on the electrical power line;
    determining a positive-sequence component for the fault electrical characteristic;
    determining a negative-sequence component for the fault electrical characteristic;
    calculating a positive-sequence difference between the positive-sequence components of the fault and prefault electrical characteristics;
    calculating a negative-sequence difference between the negative-sequence components of the fault and prefault electrical characteristics;
    calculating a first difference between a phase angle of the positive-sequence difference and a phase angle of the negative-sequence difference; and
    classifying the fault as a function of the first difference.

2. The method of claim 1, further comprising determining whether the first difference is greater than a predetermined threshold.

3. The method of claim 2, further comprising identifying the fault as a crossover fault when the first difference is greater than the predetermined threshold.

4. The method of claim 2, further comprising identifying the fault as a single-phase-to-ground fault when the first difference is less than the predetermined threshold.

5. The method of claim 2, wherein the predetermined threshold is zero.

6. The method of claim 1, further comprising identifying that the fault is a crossover fault.

7. The method of claim 1, further comprising identifying that the fault is a single-phase-to-ground fault.

8. The method of claim 1, further comprising identifying that the fault is not a phase-to-phase fault.

9. The method of claim 1, wherein the prefault electrical characteristic is a voltage.

10. The method of claim 1, wherein the prefault electrical characteristic is a current.

11. The method of claim 1, wherein the fault electrical characteristic is a voltage.

12. The method of claim 1, wherein the fault electrical characteristic is a current.

13. The method of claim 1, wherein the electrical power line is in parallel with another electrical power line.

14. The method of claim 1, further comprising correcting the fault as a function of the classifying.

15. The method of claim 1, further comprising identifying a location of the fault as a function of the classifying.

16. The method of claim 1, wherein the prefault electrical characteristic represents one phase of the three-phase electrical characteristics on the electrical power line.

17. The method of claim 1, wherein the fault electrical characteristic represents one phase of the three-phase electrical characteristics on the electrical power line.

18. The method of claim 1, wherein the method is conducted by computer-executable instructions located on a computer-readable medium in communication with the electrical power line.

19. A system for classifying faults on an electrical power line, comprising:
    a first electrical power transmission line;
    a second electrical power transmission line; and
    a fault classification device in communication with the first electrical power transmission line, wherein the fault classification device:
    measures a prefault electrical characteristic on the electrical power line,
    determines a positive-sequence component for the prefault electrical characteristic,
    determines a negative-sequence component for the prefault electrical characteristic,
    measures a fault electrical characteristic on the electrical power line,
    determines a positive-sequence component for the fault electrical characteristic,
    determines a negative-sequence component for the fault electrical characteristic,
    calculates a positive-sequence difference between the positive-sequence components of the fault and prefault electrical characteristics,
    calculates a negative-sequence difference between the negative-sequence components of the fault and prefault electrical characteristics,
    calculates a first difference between a phase angle of the positive-sequence difference and a phase angle of the negative-sequence difference, and
    classifies the fault as a function of the first difference.

20. The system of claim 19, further comprising a first power generation source and a second power generation source.

21. The system of claim 20, wherein the first electrical power transmission line is in communication with the first power generation source and the second power generation source.

22. The system of claim 20, wherein the second electrical power transmission line is in communication with the first power generation source and the second power generation source.

23. The system of claim 19, further comprising a first load in communication with the first electrical transmission line.

24. The system of claim 23, wherein the fault classification device is located between the first load and the first electrical transmission line.

25. The system of claim 19, wherein the first and the second electrical power transmission lines are three-phase systems.

26. The system of claim 19, wherein the phase-to-ground fault occurs between phase conductors of the first electrical power transmission line.

27. The system of claim 19, wherein the first electrical power transmission line is in parallel with the second electrical power transmission line.

28. The system of claim 19, wherein the prefault electrical characteristic is a voltage.

29. The system of claim 19, wherein the prefault electrical characteristic is a current.

30. The system of claim 19, wherein the fault electrical characteristic is a voltage.

31. The system of claim 19, wherein the fault electrical characteristic is a current.

32. A device for classifying faults on an electrical power line, comprising:
    a first input for receiving electrical power from a first part of an electrical transmission line;
    a second input for receiving electrical power from a second part of an electrical transmission line; and
    a processor component for classifying faults on an electrical power line, the processor performing a method comprising:
        measuring a prefault electrical characteristic on the electrical power line,
        determining a positive-sequence component for the prefault electrical characteristic,
        determining a negative-sequence component for the prefault electrical characteristic,
        measuring a fault electrical characteristic on the electrical power line,
        determining a positive-sequence component for the fault electrical characteristic,
        determining a negative-sequence component for the fault electrical characteristic,
        calculating a positive-sequence difference between the positive-sequence components of the fault and prefault electrical characteristics,
        calculating a negative-sequence difference between the negative-sequence components of the fault and prefault electrical characteristics,
        calculating a first difference between a phase angle of the positive-sequence difference and a phase angle of the negative-sequence difference, and
        classifying the fault as a function of the first difference.

33. The device of claim 32, wherein the processor component is a computer-readable medium having computer-executable instructions for performing the method.

34. The device of claim 32, wherein the prefault electrical characteristic is stored on a computer-readable medium within the processor component.

35. The device of claim 32, wherein the fault electrical characteristic is stored on a computer-readable medium within the processor component.

36. The device of claim 32, wherein the prefault electrical characteristic is a voltage.

37. The device of claim 32, wherein the prefault electrical characteristic is a current.

38. The device of claim 32, wherein the fault electrical characteristic is a voltage.

39. The device of claim 32, wherein the fault electrical characteristic is a current.

40. A computer-readable medium having computer-executable instructions for classifying faults on an electrical power line, comprising:
    measuring a prefault electrical characteristic on the electrical power line;
    determining a positive-sequence component for the prefault electrical characteristic;
    determining a negative-sequence component for the prefault electrical characteristic;
    measuring a fault electrical characteristic on the electrical power line;
    determining a positive-sequence component for the fault electrical characteristic;
    determining a negative-sequence component for the fault electrical characteristic;
    calculating a positive-sequence difference between the positive-sequence components of the fault and prefault electrical characteristics;
    calculating a negative-sequence difference between the negative-sequence components of the fault and prefault electrical characteristics;
    calculating a first difference between a phase angle of the positive-sequence difference and a phase angle of the negative-sequence difference; and
    classifying the fault as a function of the first difference.

41. The computer-readable medium of claim 40, having computer-executable instructions for determining whether the first difference is greater than a predetermined threshold.

42. The computer-readable medium of claim 41, having computer-executable instructions for identifying the fault as a crossover fault when the first difference is greater than the predetermined threshold.

43. The computer-readable medium of claim 41, having computer-executable instructions for identifying the fault as a single-phase-to-ground fault when the first difference is less than the predetermined threshold.

44. The computer-readable medium of claim 41, wherein the predetermined threshold is zero.

45. The computer-readable medium of claim 40, having computer-executable instructions for identifying that the fault is a crossover fault.

46. The computer-readable medium of claim 40, having computer-executable instructions for identifying that the fault is a single-phase-to-ground fault.

47. The computer-readable medium of claim 40, having computer-executable instructions for identifying that the fault is not a phase-to-phase fault.

48. The computer-readable medium of claim 40, wherein the prefault electrical characteristic is a voltage.

49. The computer-readable medium of claim 40, wherein the prefault electrical characteristic is a current.

50. The computer-readable medium of claim 40, wherein the fault electrical characteristic is a voltage.

51. The computer-readable medium of claim 40, wherein the fault electrical characteristic is a current.

52. The computer-readable medium of claim 40, having computer-executable instructions for correcting the fault as a function of the classifying.

53. The computer-readable medium of claim 40, having computer-executable instructions for identifying a location of the fault as a function of the classifying.

\* \* \* \* \*